United States Patent [19]

Janota

[11] Patent Number: 5,243,857

[45] Date of Patent: Sep. 14, 1993

[54] FIXTURE FOR TESTING ELECTRICAL TERMINATIONS

[75] Inventor: Kenneth F. Janota, Lisle, Ill.

[73] Assignee: Molex Incorporated, Lisle, Ill.

[21] Appl. No.: 715,296

[22] Filed: Jun. 14, 1991

[51] Int. Cl.$^5$ .......................................... G01M 19/00
[52] U.S. Cl. .................................. 73/161; 73/862.01
[58] Field of Search ........................... 73/862.01, 161; 340/665, 666, 668, 625; 439/912, 263, 264

[56] References Cited

U.S. PATENT DOCUMENTS 2,483,867 10/1949 Anderson et al. ................... 73/161
2,593,269 4/1952 Clifford et al. .................. 73/862.01

FOREIGN PATENT DOCUMENTS 0257137 2/1988 European Pat. Off. ......... 73/862.01
0964487 10/1982 U.S.S.R. ............................. 73/862.01

*Primary Examiner*—Michael T. Razavi
*Assistant Examiner*—R. Biegel
*Attorney, Agent, or Firm*—A. A. Tirva

[57] ABSTRACT

A fixture for testing the withdrawal force of a male projection from a receptacle terminal of an electrical connector. The fixture includes a frame, with a weight supported on the frame. The weight has a male projection protruding upwardly therefrom. The weight has a value corresponding to a desired withdrawal force. The projection has a shape corresponding to that of the terminal. A positioning member is supported above the male projection for positioning the electrical connector with the receptacle terminal thereof in alignment with the male projection. The positioning member is movably mounted relative to the frame for moving the electrical connector and receptacle terminal toward the male projection to interconnect the projection in the receptacle terminal and for moving the connector in an opposite direction to test if the interconnection between the male projection and the receptacle terminal is sufficient to lift the weight.

11 Claims, 2 Drawing Sheets

FIXTURE FOR TESTING ELECTRICAL TERMINATIONS

FIELD OF THE INVENTION

This invention generally relates to the art of electrical connectors and, particularly, to a fixture for testing for defective terminals in a connector. Specifically, the fixture tests the withdrawal force of a male terminal from a receptacle terminal of an electrical connector.

BACKGROUND OF THE INVENTION

One of the problems in the electrical connector industry involves the detection of defective contacts or terminals when mounted within or inserted into a connector housing. This is particularly true with female or receptacle terminals within a connector housing which are adapted to receive pin or male terminals. This problem is becoming increasingly prevalent due to the ever-increasing miniaturization of electrical connectors and the desire for high density connector systems.

A receptacle terminal need not be badly damaged in order to be defective. The terminal is designed for establishing a solid interconnection with the pin terminal, and the viability of this interconnection often can be judged by the withdrawal force necessary to pull the pin terminal out of the receptacle terminal.

Although a receptacle terminal literally can be crushed during tooling processes in fabricating a connector, there are a variety of damages to the terminal which may occur at various phases or steps in processing the terminal and/or inserting the terminal into a respective connector housing. A terminal may not be symmetrical. In other words, rather than literally crushing a terminal during manufacture, the terminal simply may be distorted. Not only could such a distortion interfere with the insertion tooling at the manufacturing end of the connector, but the distortion could prevent establishing a solid interconnection with a pin terminal at the user end.

Distortion or major damage to such terminals can occur at various points in the manufacturing process. For instance, most such terminals are stamped and formed metal members, and distortion can occur during a stamping process. The plating process also has a potential to distort contact symmetry. Terminal reeling may also be a potential problem area. Of course, random handling after plating is a problem area in distorting contacts. Lastly, machine jamming itself in inserting the terminals into a connector housing literally can crush a miniature terminal.

Although there are a variety of sophisticated procedures to detect damaged or distorted terminals, particularly during manufacturing processes, there is a definite need for a simple fixture or tool which can be used to test an assembled connector or connector subassembly either at the manufacturing or the user ends, and which can operate on simple principals.

This invention is directed to providing such a fixture or tool which is extremely simple and operates on the basics of the withdrawal force of a male or pin terminal from a female or receptacle terminal.

SUMMARY OF THE INVENTION

An object, therefore, of the invention is to provide a novel fixture for testing the withdrawal force of a male terminal from a receptacle terminal of an electrical connector.

In the exemplary embodiment of the invention, the fixture generally includes a frame, and a weight is supported on the frame. The weight includes a male projection protruding upwardly therefrom. The weight has a value corresponding to a desired withdrawal force of a male projection from the receptacle terminal, and the projection has a shape corresponding to that of the male terminal. Positioning means are supported above the male projection for positioning the electrical connector with the receptacle terminal thereof in alignment with and above the male projection. The positioning means is movably mounted on the frame for moving the electrical connector and receptacle terminal toward the projection to insert and interconnect the projection in the receptacle terminal and for moving the connector in an opposite or upward direction to test if the interconnection between the projection and the receptacle terminal is sufficient to lift the weight.

With such a simple fixture, if the weight is not lifted it indicates that the receptacle terminal is distorted or otherwise defective, i.e. that it cannot establish a desired interconnection with the male projection sufficient to lift the weight. Of course, if the receptacle terminal is considerably crushed, the male projection of the test fixture might not even be able to move into the connector.

The invention also contemplates signal means operatively associated with the weight for rendering a signal whether or not the weight is lifted.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
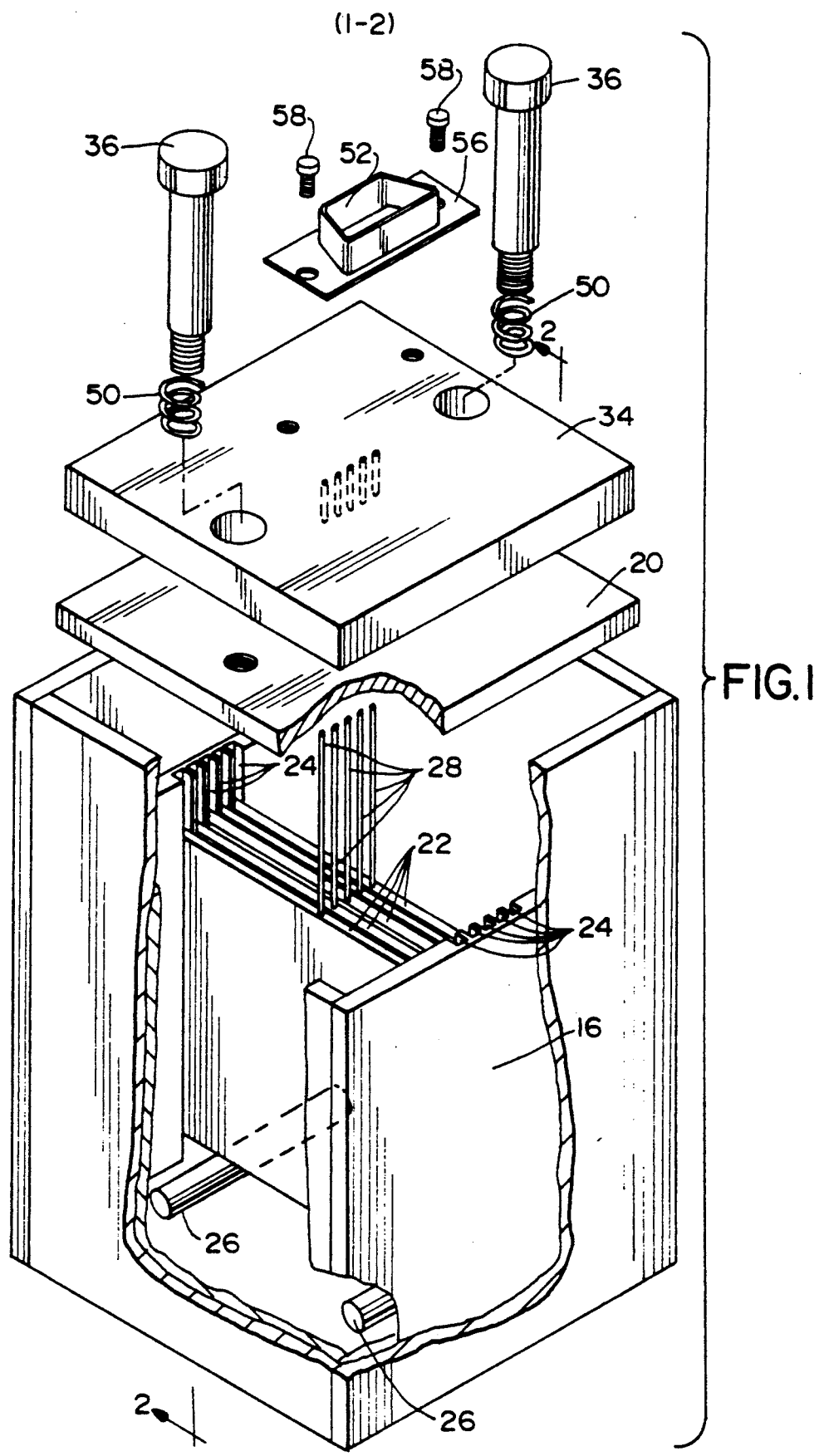
FIG. 1 is a fragmented, exploded perspective view of the fixture of the invention illustrating the basic components thereof, and with the front housing area of the fixture removed to facilitate the illustration.
Figure 2:
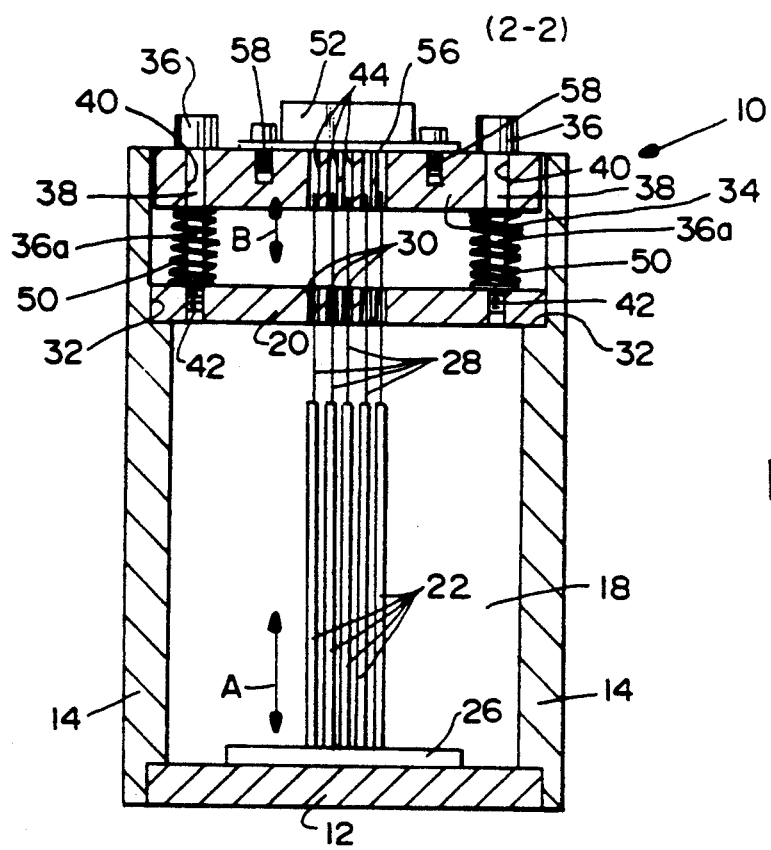
FIG. 2 is a vertical section taken generally along line 2—2 of FIG. 1.

Referring to the drawings in greater detail, and first to FIGS. 1 and 2, a test fixture, generally designated 10, is shown to include a box-like frame which includes a base or bottom wall 12, upstanding supports or side walls 14, front and rear walls 16 and 18, respectively, and a top wall or cover 20. A plurality of plate-like weights 22 are located within the interior of the frame. The weights are freely movable in a vertical direction, as indicated by double-headed arrow "A" (FIG. 2), the weights being guided in their movement by channels 24 (FIG. 1) fixed to the inside of front and rear walls 16 and 18, respectively. The weights are supported on bottom wall 12 of the frame by means of a pair of contact rods 26 which are fabricated of conductive material such as brass or the like, for purposes described hereinafter.

It should be understood that the number of weights 22 provided for any test fixture 10 is determined by the number of receptacle terminals in a particular electrical connector which is to be tested, as will be apparent hereinafter. In any event, for illustration purposes, it is assumed that the electrical connector(s) to be tested includes five receptacle terminals, so five weights 22 are provided.

Each weight 22 has a male projection 28 protruding upwardly therefrom through passages 30 in top wall 20. The male projections are freely movable within the passages in the direction of double-headed arrow "A", and the projections protrude upwardly from the outside or top of top wall 20.

The top wall is supported in a cut-out area 32 on the inside of at least side walls 14 of the frame, whereby the top wall rests in the cut-out area and may be press fit or otherwise secured in that position.

Generally, positioning means are supported for movement relative to the frame of the test fixture toward and away from weights 22 and the upwardly protruding male projections 28, for positioning an electrical connector for movement therewith. More particularly, the positioning means are provided, in part, by means of a second top wall or cover 34 sized and shaped for movement within cut-out area 32, whereby the surrounding walls 14-18 of the frame sort of act as a cylinder means, with cover 34 acting as a piston movably mounted therein in the direction of double-headed arrow "B" (FIG. 2). A pair of cap screws 36 extend downwardly through bushings 38 within holes 40 in cover 34, with the shafts 36a of the cap screws being threaded into top wall 20, as at 42. Therefore, the cap screws act as guide rods for vertical reciprocal movement of cover 34. The cover also has a plurality (five in the illustrated embodiment) through passages 44 into which male projections 28 from weights 22 project and freely move.

Cover 34 is spring loaded by a coil spring 50 surrounding each cap screw shaft 36a and sandwiched between top wall 20 and cover 34. Therefore, when a user pushes cover 34 downwardly in the direction of arrow "B" (FIG. 2), the springs will compress and, upon release of the cover, the springs will return the cover back to the position shown in FIG. 2. Of course, the strength of the springs must be sufficient to lift the total weight of weights 22, as will be apparent hereinafter.

Figure 3:
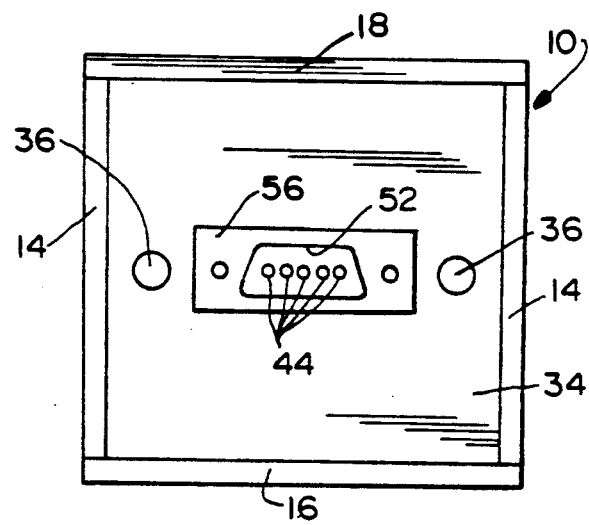
FIG. 3 is a top plan view looking downwardly onto FIG. 2.

Referring to FIG. 3 in conjunction with FIG. 2, the portion of the positioning means for receiving and positioning an electrical connector is shown in the form of a D-shaped receptacle 52 with an integral bottom plate 56. Bottom plate 56 is loosely secured to the top surface of cover 34 by a pair of bolts 58 (FIG. 2) or other appropriate fastening means permitting a small amount of motion relative to cover 34 the reason for which will be discussed later on. Passages 44 in cover 34 are seen looking down through receptacle 52 in FIG. 3. For illustration purposes, the positioning means (including receptacle 52 and plate 56 secured to cover 34) are designed for receiving and positioning a conventional miniature D-Sub electrical connector. Consequently, receptacle 52 simulates a metal shield component of such a connector, as is known in the art. The housing of such a connector, as is known, includes a protruding D-shaped portion which would fit into receptacle 52, the housing being loaded with its receptacle terminals. In this case, the D-Sub connector would have five receptacle terminals located in its housing. When the connector and its receptacle terminals are positioned within receptacle 52, the receptacle terminals, passages 44 in cover 34, male projections 28 and passages 30 in top wall 20, all are in respective vertical registry or alignment.

Therefore, when cover 34 is pushed downwardly in the direction of arrow "B", preferably by pushing down on the connector itself, male projections 28 effectively will be inserted into the receptacle terminals of the connector, keeping in mind that the male projections have shapes corresponding to that of the particular terminals to be terminated in the connector.

Plate 56 is allowed to float a predetermined amount created by specific clearance between the diameter of the bolts 58 and the diameter of the bolt accommodating holes in the bottom plate 56 in order to eliminate any frictional interference forces between the male projections 28 and the inside surfaces of the receptacle terminal sockets which may be present due to tolerance buildup in manufacturing or inadvertent misalignment of receptacle 52.

When the electrical connector, i.e. cover 34, are released, springs 50 will move the connector and cover upwardly, back to the position shown in FIG. 2. If there is a proper interconnection between each of male projections 28 within the respective receptacle terminals of the connector, weights 22 will be lifted with the connector. This will indicate that there is a proper interconnection between the male projections and the receptacle terminals, based on the fact that there is a sufficient withdrawal force at the interconnections to lift the weights. To that end, it should be understood that weights 22 will be selected as of a value to equal a desired withdrawal force for each of the terminals to be interconnected with the receptacle terminals in the connector.

As the user removes the connector under test from the receptacle 52, the male projection 28 are stripped from the connector terminals when the top of weights 22 contact the bottom surface of the top wall 20.

At this point, it should be understood that, while a miniature D-Sub electrical connector has been used in the above description of the invention in order to exemplify the principals of the invention, all kinds, shapes and configurations of connectors as well as any number of terminals therein can be tested within the concepts of the invention. In fact, various sets of top walls 20 and covers 34 can be readily available with different arrays and numbers of passages 30 and 44, respectively, therethrough. A variety of springs 50 of different values can be made available. Additional weights can be made available, and additional channels 24 (FIG. 1) in front and rear walls 16 and 18, respectively, can be added to accommodate additional weights. Of course, different configurations of receptacles 52 can be made available for a variety of connector configurations. All of these variables and components of different parameters are well within the concepts of the invention, a five terminal D-Sub electrical connector being used for illustration purposes herein.

As stated above, contact rods 26 (FIGS. 1 and 2) are fabricated of conductive material such as brass or the like, while channels 24 are fabricated from non-conductive or insulative material. These contacts can be used to energize or de-energize any variety of signal means for rendering a signal whether or not all of weights 22 have been lifted off of the contact rods. To that end, weights 22, which are in the form of plates shown in FIG. 1, either should be fabricated of conductive material or some form of bridging conductor should span the bottom or top if appropriate of the weight plates for conductively interconnecting contact rods 24 to establish a circuit therethrough when the weights come into contact with the rods.

Figure 4:
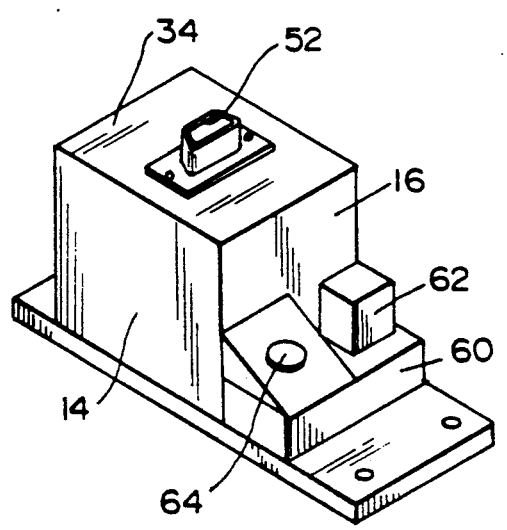
FIG. 4 is a perspective view of the assembled fixture.

FIG. 4 shows an example of a signal means wherein the front of the fixture is provided with a housing 60 for mounting a battery 62 and a signal means shown in the form of a bright light 64. As is well within the purview of a person in the electrical art, contact rods 26 can be coupled in a simple circuit with battery 62 and signal light 64 so that the light is energized when at least one of weights 22 interconnect contact rods 26.

From the above description, it can be understood that if there is a sufficient withdrawal force maintained between each of male projections 28 within their respective receptacle terminals in the appropriate electrical connector, when springs 50 lift the weights off of contact rods 26, the circuit therebetween will be broken. In the example shown in FIG. 4, signal light 64 then would go out and a person thereby would be rendered a signal that all of the interconnections between the male projections and the connector receptacle terminals are adequate. However, assume that one of the receptacle terminals in the electrical connector is defective, such as being crushed, distorted or the like whereby an insufficient interconnection results between a particular male projection 28 and its respective receptacle terminal, the corresponding weight will not be lifted off of contact rods 26. Consequently, the signal or warning light 64 will remain energized. This will indicate to an operator that at least one of the interconnections within the connector is defective. Of course, many other schemes can be designed using contact rods 26 and a conductor therebetween in conjunction with weights 22. Audible signals, LED displays and the like might be used in an appropriate circuit whereby when the circuit between contact rods 26 is broken, another circuit takes over to actuate a warning audible signal or the like.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. A fixture for testing the withdrawal force of a male projection from a receptacle terminal of an electrical connector, comprising:
   a frame including a base, upright support portions projecting upwardly from the base and a top portion spanning the upright support portions;
   a weight vertically slidable within the frame and having a male projection protruding upwardly therefrom, the weight having a value corresponding to a predetermined withdrawal force to be applied by the male projection, the projection having a shape corresponding to that of the terminal;
   positioning means slidably mounted on the frame above the male projection for positioning the electrical connector with the receptacle terminal thereof in alignment with the male projection, the positioning means being movable for first moving the electrical connector and receptacle terminal toward the male projection to interconnect the projection in the receptacle terminal and then for moving the connector back to its original position to test if the interconnection between the male projection and the receptacle terminal is sufficient to lift the weight; and
   spring loaded support means for supporting said positioning means on the frame whereby the positioning means and a positioned electrical connector are movable against a spring bias toward the male projection and, when released, the positioning means and electrical connector are moved automatically in the opposite direction under the influence of the spring bias.

2. The fixture of claim 1 including guide means on the frame for guiding the male projection into the receptacle terminal of the positioned electrical connector.

3. The fixture of claim 1 wherein said spring loaded support means include a guide rod along which the positioning means moves, and a coilspring surrounding the guide rod and biased between the positioning means and the frame.

4. The fixture of claim 1 including signal means operatively associated with said weight for rendering a signal when the weight is lifted.

5. The fixture of claim 4 wherein said signal means include contact means engageable by said weight when supported on the frame.

6. The fixture of claim 5 wherein said contact means comprises a pair of spaced contacts and said weight includes conductor means spanning said contacts.

7. A fixture for testing withdrawal force of each of a plurality of male projections from respective receptacle terminals of an electrical connector, comprising:
   a frame including a base, upright support portions projecting upwardly from the base and a top portion spanning the upright support portions;
   a plurality of weights slidably supported on the base and each having a male projection protruding upwardly therefrom through a respective guide passage in the top portion of the frame, each weight having a value corresponding to a predetermined withdrawal force of a terminal from a respective receptacle terminal, and each projection having a shape corresponding to that of one of the terminals;
   a positioning member slidably mounted on the guide means above the top portion of the frame and including a receptacle for a portion of the electrical connector to align the receptacle terminals of the connector with the male projections, the positioning member being movable along the guide means relative to the frame for first moving the electrical connector and receptacle terminals toward the male projections to interconnect the projections in the receptacle terminals and then for moving the electrical connector back to its original position to test if the interconnection between the male projections and the receptacle terminals are sufficient to lift the weight; and
   wherein said guide means are spring loaded whereby the positioning means and a positioned electrical connector are movable against a spring bias toward the male projections and, when released, the positioning means and electrical connector are moved automatically in the opposite direction under the influence of the spring bias.

8. The fixture of claim 7 wherein said guide means include guide rod with a coil spring surrounding each guide rod for biasing the positioning member away from the top portion of the frame.

9. The fixture of claim 7 including signal means operatively associated with said weights for rendering a signal when the weights are lifted.

10. The fixture of claim 9 wherein said signal means include contact means engageable by said weights when supported on the frame.

11. The fixture of claim 10 wherein said contact means comprises a pair of spaced contacts and said weights includes conductor means spanning said contacts.

* * * * *